United States Patent
Roth-Stielow et al.

(10) Patent No.: US 6,297,573 B1
(45) Date of Patent: Oct. 2, 2001

(54) THREE-PHASE MOTOR

(75) Inventors: Jörg Roth-Stielow, Bretten; Josef Schmidt, Graben-Neudorf, both of (DE)

(73) Assignee: Sew-Eurodrive GmbH & Co., Bruchsal (DE)

( * ) Notice: Subject to any disclaimer, the term of this patent is extended or adjusted under 35 U.S.C. 154(b) by 0 days.

(21) Appl. No.: 09/508,385

(22) PCT Filed: Sep. 10, 1998

(86) PCT No.: PCT/EP98/05786

§ 371 Date: May 16, 2000

§ 102(e) Date: May 16, 2000

(87) PCT Pub. No.: WO99/13565

PCT Pub. Date: Mar. 18, 1999

(30) Foreign Application Priority Data

Sep. 10, 1997 (DE) .............................. 197 39 780

(51) Int. Cl.[7] .............................. H02P 7/62; H02K 11/00; H02H 7/08
(52) U.S. Cl. ................ 310/68 C; 310/68 R; 374/152; 318/798; 361/140
(58) Field of Search ................ 310/68 C, 67 R, 310/68 R; 374/152; 318/798; 361/140; 337/298

(56) References Cited

U.S. PATENT DOCUMENTS

| | | | |
|---|---|---|---|
| 4,016,459 | | 4/1977 | Boehringer ............................ 361/88 |
| 4,542,324 | * | 9/1985 | Leuthen ............................. 318/798 |
| 4,879,497 | * | 11/1989 | Meyer et al. ....................... 318/354 |
| 5,202,596 | * | 4/1993 | Jensen et al. ......................... 310/64 |
| 5,296,789 | * | 3/1994 | Ohi ..................................... 318/254 |
| 5,406,186 | | 4/1995 | Fair .................................... 318/798 |
| 5,510,687 | * | 4/1996 | Ursworth et al. .................. 318/727 |
| 5,577,152 | * | 11/1996 | Chen .................................. 388/804 |
| 6,094,026 | * | 7/2000 | Cameron ............................ 318/471 |

FOREIGN PATENT DOCUMENTS

| | | |
|---|---|---|
| 1 220 042 | 6/1966 | (DE) . |
| 0 456 169 | 11/1991 | (EP) . |

OTHER PUBLICATIONS

"An Efficient Variable Speed Drive Scheme For Squirrel Cage Induction Motors Using Stator Neutral Switching" Sharaf, A M, et al.; Sep. 5, 1993, pp. 826–830.

* cited by examiner

Primary Examiner—Burton S. Mullins
(74) Attorney, Agent, or Firm—Marshall, Gerstein & Borun

(57) ABSTRACT

A three-phase a.c. motor for operation with a three-phase mains supply (1), with three single- or multiple-strand windings (2u, 2v, 2w) in a star configuration (2) in which terminals (U2, V2, W2) at the neutral ends of the windings (2u, 2v, 2w) are accessible outside the set of windings (2), with an electronic switch (4) so constructed and so connected by way of switch terminals (U3, V3, W3) to the neutral-end terminals (U2, V2, W2) that the latter can be electrically connected to one another during a process of turning on and disconnected from one another during a process of turning off, and with a control circuit (5) designed to control the electronic switch (4) and connected to the latter. By integration of the electronic switch (4) and the control circuit (5) within the terminal box of the three-phase motor, both the space required and the number of electronic components can be dramatically reduced in comparison to known three-phase motors.

12 Claims, 3 Drawing Sheets

THREE-PHASE MOTOR

BACKGROUND OF THE INVENTION

The invention relates to a three-phase a.c. motor for operation with a three-phase mains supply.

Three-phase a.c. motors with three single- or multiple-strand windings are customarily powered by a three-phase mains supply in such a way that they can be turned on and off. A known arrangement for this purpose is to dispose, between the three-phase mains and the terminals that connect the motor to the mains, two- or three-phase electromechanical switches, relays or contactors by means of which the electrical connection between the three-phase mains and the motor is made or broken. Instead of electromechanical switching elements, it is becoming increasingly common to use electronic switching elements. With the latter, contact abrasion is avoided. The electronic switching elements allow the amount of current that flows to be controlled by gate terminals. As in the case of electromechanical switching elements, at least two electronic switching elements are required. Ordinarily these consist of triacs, alternistors or a combined system in which each triggering circuit is connected to two thyristors in an antiparallel arrangement.

To reduce line and radio disturbances associated with turning the three-phase motor on and off, and to protect the electronic switches, additional components are added to the circuitry, such as RC elements, recovery diodes and varistors. both the electromechanical switches and the electronic switching elements are customarily separated spatially from the three-phase motor, being disposed in switch cabinets or boxes. This arrangement takes up extra space, in addition to that required for the motor itself. Furthermore, additional material is required to construct the switch cabinet or switch box.

Another known feature is the provision of a mechanical relay (contactor) for each phase in the mains supply line, or also of relays switching onto the neutral point. Such arrangements make the cable construction considerably more elaborate and space-consuming.

When electronic switching elements are used to turn the three-phase motor on and off, the total number of switching and peripheral elements is quite large. As a result, considerable costs are incurred in both manufacture and maintenance of the switching arrangements.

The object of the invention is to disclose a three-phase a.c. motor that is turned on and off by electronic switching elements, such that the overall space required and the number of electronic components are reduced in comparison to the known three-phase a.c. motors and electronic switches, and the reliability of operation is improved.

SUMMARY OF THE INVENTION

A three-phase motor having the characteristics given in claim 1. Further developments are treated.

The three-phase motor in accordance with the invention, for operation with a three-phase mains supply, comprises three single- or multiple-strand windings in a star configuration, such that the neutral ends of the windings are connected to externally accessible terminals. In addition the three-phase motor comprises an electronic switch that is so constructed and so connected to the neutral-end terminals, by way of switch connectors that when the motor is turned on the neutral-end terminals can be put into electrical contact with one another, and when the motor is turned off they can be separated from one another. To control the electronic switch, which preferably consists of thyristors, a control circuit is connected to the electronic switch.

Preferably both the electronic switch and the control circuit are disposed in a terminal box of the three-phase motor, within which are also situated the neutral-end terminals of the windings. In any case, however, the overall space required for the motor and the associated switching arrangement for turning the motor on and off is less than in the known three-phase motors. Also, because of the star configuration the number of electronic components is reduced. Furthermore, there is no need for multiple-phase leads to connect a three-phase motor with a switch cabinet or box.

The terminal box is made of a material with high heat conductance, preferably with external cooling vanes, so that the heat produced in the electronic switch can be released to the exterior by way of the terminal box. Furthermore, the terminal box is attached to the housing of the three-phase motor by way of a gasket, so that the heat-conduction resistance between housing and terminal box is low. The temperature of the terminal box is therefore somewhat different from that of the motor housing.

The electronic switch is constructed as a hybrid circuit, being combined with the temperature sensor and where appropriate also with the electronic control circuit; the components are seated on a ceramic mounting substrate and mounted directly on a hybrid board made of a material with high heat conductance, in particular of copper, so that the heat given off by the electronic switch is transferred to the hybrid board with an extremely low thermal resistance and from the board to the terminal box practically without thermal resistance. The temperature sensor is mounted in a position relative to the electronic switch such that the temperature of the copper hybrid board corresponds to that of the temperature sensor and a certain residual thermal resistance exists between the electronic switch and the temperature sensor.

Preferably at least one additional temperature sensor is provided, which measures the temperature of the windings and for this purpose is mounted in the immediate vicinity thereof. This sensor is connected to the control circuit in such a way that the electronic switch can be turned on only if the winding temperature does not exceed a preset value. By this means protection for the motor windings is also provided in a simple manner.

Because the temperature of the motor housing also influences the temperature of the terminal box, a very reliable thermal monitoring of the whole three-phase motor is thus ensured in a simple way. With this indirect monitoring of the motor temperature, by way of its housing, in some circumstances the additional temperature sensor for the windings becomes unnecessary.

The control circuit comprises an output that signals the operating state as a binary state. When the temperature of the motor or the temperature of the hybrid board (of the electronic switch) exceeds a critical level, or also when the voltage supply for the electronics is disturbed or absent, a binary state is signalled other than that corresponding to the case in which all operating parameters have the normal values. This signal can also be used for other or additional purposes, such as to trigger an alarm signal.

It is preferable for the control circuit to be connected to a measurement device that is in turn connected to the switch terminals, and which senses the voltage at the neutral ends of the windings, the control circuit being so constructed that the processes of switching on and off are controllable in dependence on the neutral-end voltages. In this way the operating safety of the three-phase motor can be increased, in particular for the electronic components, because the level of the neutral-end voltages can be taken into account in controlling the electronic switch.

In a further elaboration the control circuit is so constructed that in response to an external "on" signal, the electronic switch is turned on if at the same time one of the neutral-end voltages exceeds a first threshold voltage, which is higher than a residual voltage between the switch terminals in the turned-on state of the switch, but considerably lower than the voltage of the three-phase mains supply. In particular, the first threshold voltage is 2–5%, preferably 3% of the voltage of the mains supply.

Preferably the control circuit, in particular to protect against overvoltages, is so constructed that the switch is turned on or off when one of the neutral-end voltages exceeds or falls below, respectively, a second threshold value which is higher than the voltage of the three-phase mains supply but lower than a damaging voltage, above which components of the switch or of the control circuit would be damaged or destroyed. In particular, when the second threshold voltage is exceeded, the switch is turned on regardless of whether or not an external "on" signal commands that it be turned on. The measurement of the neutral-end voltages can thus be utilized in several ways, as a result of which there is no need for special components, in particular electronic ones such as Zener diodes or varistors, to protect electronic components of the system from damage.

In the invention the space- and component-saving design of the motor in accordance with the invention is particularly effective in that it eliminates the need for long measurement leads, in particular between temperature-sensitive components (windings) of the three-phase motor and a switch cabinet or box situated at a distance. Measurement and evaluation take place in the immediate vicinity of the temperature-sensitive components.

Especially preferred is an embodiment in which the electronic switch comprises an energy-supply apparatus that supplies the electronic switch with switching or triggering power and is so constructed, and bridges the electronic switch in such a way, that when the electronic switch is turned on, the residual voltage at its terminals can be used as the supply voltage for the energy-supply apparatus.

In the following the invention is explained by description of exemplary embodiments. However, the invention is not limited to these exemplary embodiments. Their description is assisted by the attached drawings, wherein

DETAILED DESCRIPTION

Figure 1:
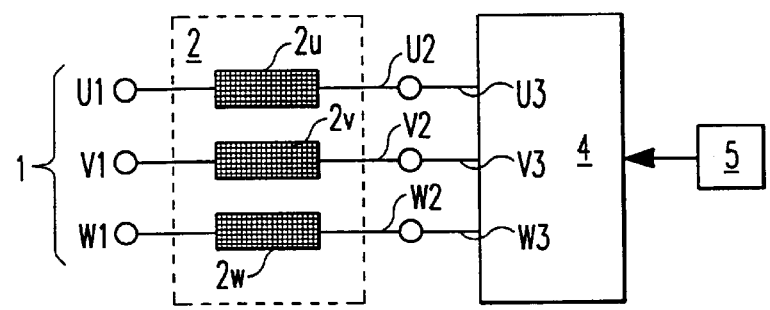
FIG. 1 is a basic circuit diagram of one exemplary embodiment of the invention.

In the following description identical reference numerals are used for the same parts and parts with the same action.

FIG. 1 shows the basic circuit diagram of an exemplary embodiment of the invention. Here the numeral 1 designates a three-phase mains supply, symbolized by the angled bracket. 2 designates the three windings of a three-phase motor, which are individually designated 2u, 2v and 2w; these are connected to the three phases of the mains supply 1 by way of the mains terminals U1, V1 and W1 and at their ends away from the mains terminals U1, V1 and W1 form neutral-end terminals U2, V2 and W2, respectively. U3, V3 and W3 are terminals of an electronic switch 4, each of which is connected to one of the neutral-end terminals U2, V2 and W2, and 5 is a control circuit connected to the electronic switch 4 for the control thereof.

In the following an example is given for the operation of the circuit arrangement according to FIG. 1. Initially the electronic switch 4 is in a turned-off state; that is, the switch terminals U3, V3, W3 of the switch 4 are not connected to one another in such a way as to conduct an amount of current sufficient to operate the three-phase motor. While the system is in this state, a command signal is given to the control circuit 5, with the result that the control circuit 5 sends to the switch 4 a control signal that puts the switch 4 into a conducting state. In this conducting state the switch terminals U3, V3, W3 are so connected to one another that they conduct current, so that operation of the three-phase motor begins and is continued. When it receives a second command signal, the control circuit 5 sends to the electronic switch 4 a control signal such that the switch 4 returns to a non-conducting state. Alternatively, the first control signal, which puts the switch 4 into the conducting state, continues to be present until the second command signal is given; then, in response to the second command signal the transmission of the control signal is terminated, so that the switch 4 returns to the non-conducting state.

Figure 2:
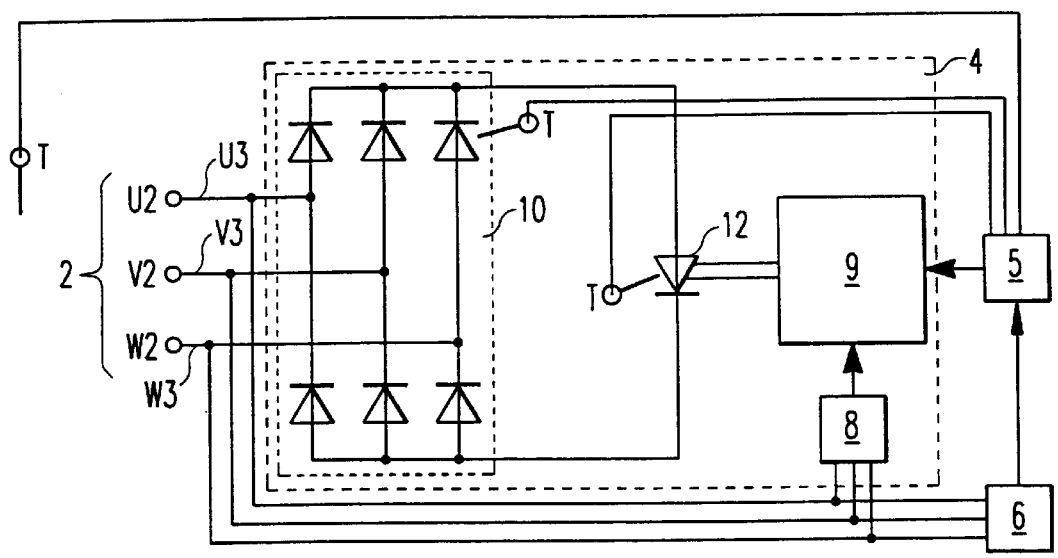
FIG. 2 shows a circuit arrangement with an electronic switch to turn a three-phase a.c. motor on and off.

FIG. 2 shows, as an example, an embodiment of a circuit arrangement corresponding to the right part of the basic circuit diagram of FIG. 1. An angled bracket and the reference numeral 2 symbolize the left part of FIG. 1. Within a rectangle outlined by a dashed line the switch 4 is shown. It comprises an uncontrolled rectifier bridge 10 with a total of 6 semiconductor diodes, arranged in pairs oriented in the same direction, each pair on a-separate conductor strand. The strand section joining the two semiconductor diodes in each pair is connected to one of the switch terminals U3, V3, W3. The three conductor strands are short-circuited with one another at each end. The uncontrolled rectifier bridge so formed thus has two ends, connected to one another by way of an electronic valve 12 that can be turned on and off. The valve 12 is preferably a switching transistor so connected that when it is in its conducting state, current can flow through the rectifier bridge 10 in the conducting direction of the diodes. The electronic valve 12 can be turned on and off by way of its connection to a triggering unit 9, which in turn is connected to an energy supply apparatus 8 that supplies the electronic switch 4 with energy.

The energy supply apparatus 8 makes a separate connection with each of the three switch terminals U3, V3, W3. The three switch terminals U3, V3, W3 are also connected to a measurement device 6, which in turn is connected to the control circuit 5. The control signal from the control circuit 5 is transmitted by way of the triggering unit 9.

So that the temperatures of temperature-sensitive components can be monitored, the circuit arrangement according to FIG. 2 is provided with a total of 3 temperature sensors T. On the left side in FIG. 2 can be seen a temperature sensor T that measures a temperature at a place in the set of windings 2 that is in danger of overheating. Another temperature sensor T measures the temperature of the uncontrolled rectifier bridge 10, which is installed on a base with high thermal conductivity, so that suitable cooling will be ensured. The third temperature sensor T measures the temperature of the on/off electronic valve 12. Each of the three temperature sensors T is connected by way of a measurement lead to the control circuit 5.

The circuit arrangement according to FIG. 2 functions as follows. Beginning with the electronic switch 4 in its non-conducting state, when a command signal is received from the control circuit 5 a control signal is sent to the triggering unit 9, so that the valve 12 is put into the conducting state. A prerequisite for this to occur, however, is that none of the temperature sensors T is detecting a temperature dangerous to the associated temperature-sensitive component. Otherwise the control circuit 5 ignores the command signal and does not send to the triggering unit 9 a control signal for turning on the valve 12. When the valve 12 is in its conducting state, current can flow from one end to the other of each of the three conductor strands in the rectifier bridge 10. In this state the associated three-phase motor is in operation. In response to another command signal, or when the first command signal is terminated, the triggering unit 9 receives from the control circuit a control signal that causes the valve 12 to be put into the non-conducting state, with the consequence that the flow of current between the ends of the three conductor strands in the rectifier bridge 10 is interrupted. The energy for this switching process is provided to the triggering unit 9 by the energy supply apparatus 8, which utilizes one or more of the residual voltages between the switch terminals U3, V3, W3. Because semiconductor diodes are used for the uncontrolled rectifier bridge and the electronic valve 12, which in particular comprises a switching transistor, such residual voltages are present even while the three-phase motor is in operation. For the process of turning the system on voltages are in any case available between the switch terminals U3, V3 and W3, insofar as the three-phase mains supply is functional and connected.

Other modes of operation are possible in addition to those described above. To ensure that the components of the circuit arrangement of FIG. 2 are protected against overvoltage, the measurement device 6 measures the voltages between the switch terminals U3, V3, W3 and transmits the measured values and/or a signal representing these values to the control circuit 5. Hence the control circuit 5 can detect a voltage so high as to endanger the components of the electronic switch 4 and put the valve 12 into its electrically conducting state by way of the triggering unit 9, even without receiving a command signal. Brief dangerous overvoltages can thus be dissipated. In this process the increase of the short-circuit-current within the electronic switch 4 is attenuated by the inductances of the windings of the three-phase motor. Furthermore, a reduction of the overvoltages is measured by the measurement device 6 and detected by the control circuit 5, which thereupon sends a control signal to the triggering unit 9 that causes the valve 12 to be put into the non-conducting state. As a reference value with which to determine whether the electronic switch 4 should be turned on or off to protect against overvoltages, a threshold voltage is specified that is higher than the voltage of the three-phase mains supply but lower than a damaging voltage, above which components of the switch 4 or of the control circuit 5 or other components of the circuit arrangement would be damaged or destroyed.

Figure 3:
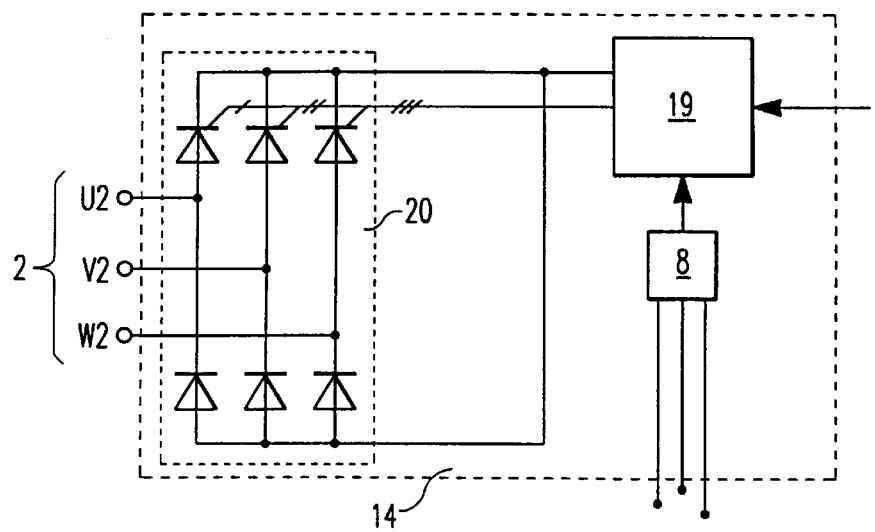
FIG. 3 shows a circuit arrangement with another electronic switch to turn an electric motor on and off.

FIG. 3 shows part of a circuit arrangement like that of FIG. 2 but with a different electronic switch. The electronic switch 14 comprises a partially controlled rectifier bridge 20 instead of an uncontrolled rectifier bridge with an electronic valve. Accordingly, a modified triggering unit 19 is provided. The partially controlled rectifier bridge 20 is constructed similarly to the uncontrolled rectifier bridge 10 shown in FIG. 2, except that the pair of semiconductor components in each of the three conductor strands consists of one semiconductor diode and one thyristor with the same polarity. That is, the thyristor takes the place of one of the semiconductor diodes in each conductor strand according to FIG. 2. In the case of FIG. 3, the thyristors are downstream, from the viewpoint of the technical current-flow direction, with respect to the associated semiconductor diodes. However, it is also possible to dispose the thyristors upstream of the semiconductor diodes.

The control terminals of the three thyristors are connected by way of control leads to the triggering unit 19. The triggering unit 19 is also connected to the ends of the three conductor strands of the rectifier bridge 20. As in the circuit arrangement of FIG. 2, an energy supply unit 8 is a component of the electronic switch 14. Temperature sensors, the control circuit, the device to measure voltages between the switch terminals of the switch 4 and the associated leads are not shown in FIG. 3.

Upon receipt of an appropriate command signal the control circuit sends a control signal to the triggering unit 19, whereupon the latter sends a trigger pulse to the three thyristors and thus puts the thyristors into the electrically conducting state. Preferably, however, this occurs only if at the time of arrival of the command signal one of the voltages between the switch terminals of the switch 4 exceeds a threshold, which is greater than the residual voltage between the terminals of switch 4 in the electrically conducting state of the thyristors but is very much smaller than the voltage of the three-phase mains supply. The threshold value is preferably about 3% of the mains voltage. In response to a command signal for turning off the switch 4, or when the temperature of a temperature-sensitive component becomes too high, the control circuit 5 transmits a control signal to the triggering unit 19, whereupon the latter no longer sends out the pulse to trigger the thyristors; hence at the next moment of commutation the partially controlled rectifying bridge 20 is put into the non-conducting state. It is preferred that the thyristors or the switch 4 also be turned on, i.e. put into the electrically conducting state, in the presence of a measurement signal elicited by an overvoltage at the switch terminals of the switch 4.

Figure 4:
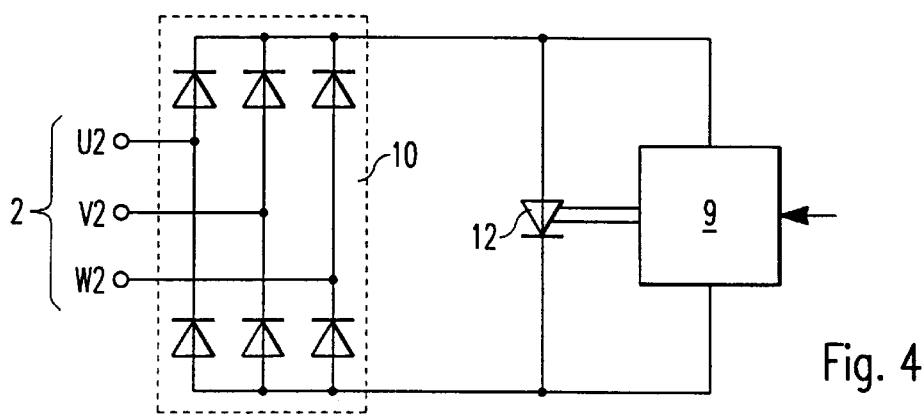
FIG. 4 shows a variant of part of the circuit arrangement according to FIG. 2.

FIG. 4 likewise shows part of a circuit arrangement to which additional components can be added, like that in FIG. 2. The circuit arrangement according to FIG. 4 corresponds in its essential components to the electronic switch of FIG. 2, but the triggering unit 9 comprises two additional connecting leads so that it can be connected to the ends of the three conductor strands of the rectifier bridge 10, bridging the valve 12. Alternatively, one of the two additional connecting leads can be eliminated if one of the two triggering leads shown here, between the triggering unit 9 and the valve 12, is connected to one end of the conductor strands of the rectifier bridge 10 or to the terminal of the latter to which the valve 12 is connected.

Preferably there is applied to the triggering unit 9, by way of the additional connecting leads or by way of one additional connecting lead and one of the triggering leads, a residual voltage across the conductor strands of the rectifier bridge 10, by means of which the electronic valve 12 is controlled. This voltage provides a trigger energy for triggering the valve 12.

Figure 5:
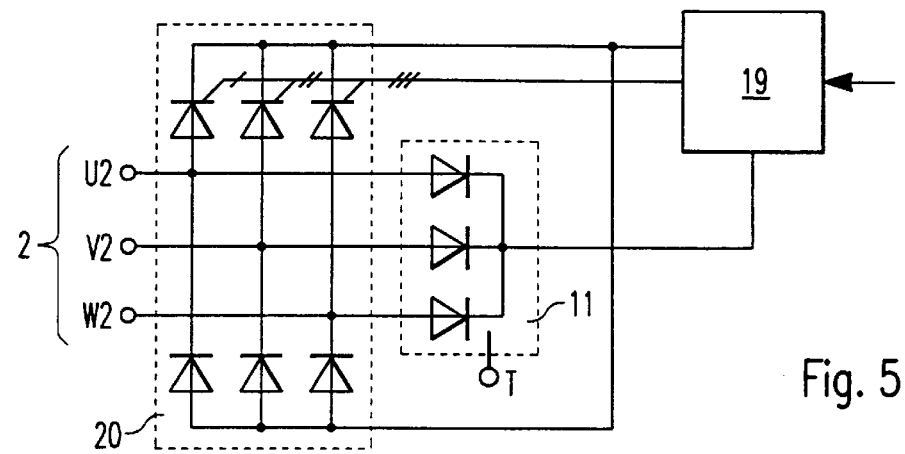
FIG. 5 shows a variant of the circuit arrangement according to FIG. 3.

The circuit arrangement shown in FIG. 5 is a modification of the circuit arrangement of FIG. 3, in a relation like that of FIG. 4 to FIG. 2. Here the trigger energy to trigger the thyristors is provided by an accessory rectifier 11 comprising three semiconductor diodes. Each of the three semiconductor diodes is connected to the triggering unit 19 by way of a common lead from the accessory rectifier 11. The other end of each of the semiconductor diodes is connected to one of the terminals of the electronic switch. In this way energy for switching can be obtained from the voltage difference between the switch terminals and the ends of the three conductor strands of the rectifier bridge 20 on the thyristor side. It is also possible to obtain switching energy by utilizing the voltage between the switch terminals and the end on the diode side, if a connecting lead is provided between this end and the triggering unit 19.

As in the circuit arrangement shown in FIG. 2, a device can be provided for monitoring the temperature of temperature-sensitive components. This is indicated for the accessory rectifier 11 by a temperature sensor T.

A device for protecting the components from overvoltages can also be provided. When such an overvoltage is present, the electronic switch is put into an electrically conducting state by triggering the thyristors.

Three-phase motors, in particular those to be used as geared motors, are often combined with an electromagnetically actuated mechanical brake, which further improves the already good controllability of the three-phase motors. A voltage supply for such an electromagnetically actuated mechanical brake is preferably obtained by way of a connection between the terminals of one of the three stator windings, e.g. between the mains connector U1 and the neutral-end terminal U2 in FIG. 1. When current flows through the corresponding winding—that is, when the electronic switch 4 is in an electrically conducting state—there is a voltage difference between these terminals. Therefore, during the operation of the three-phase motor an excitation coil of the brake is supplied with current, so that the brake is raised. As soon as the electronic switch is turned off, the supply voltage collapses, so that the brake engages and the three-phase motor is immobilized.

Figure 6:
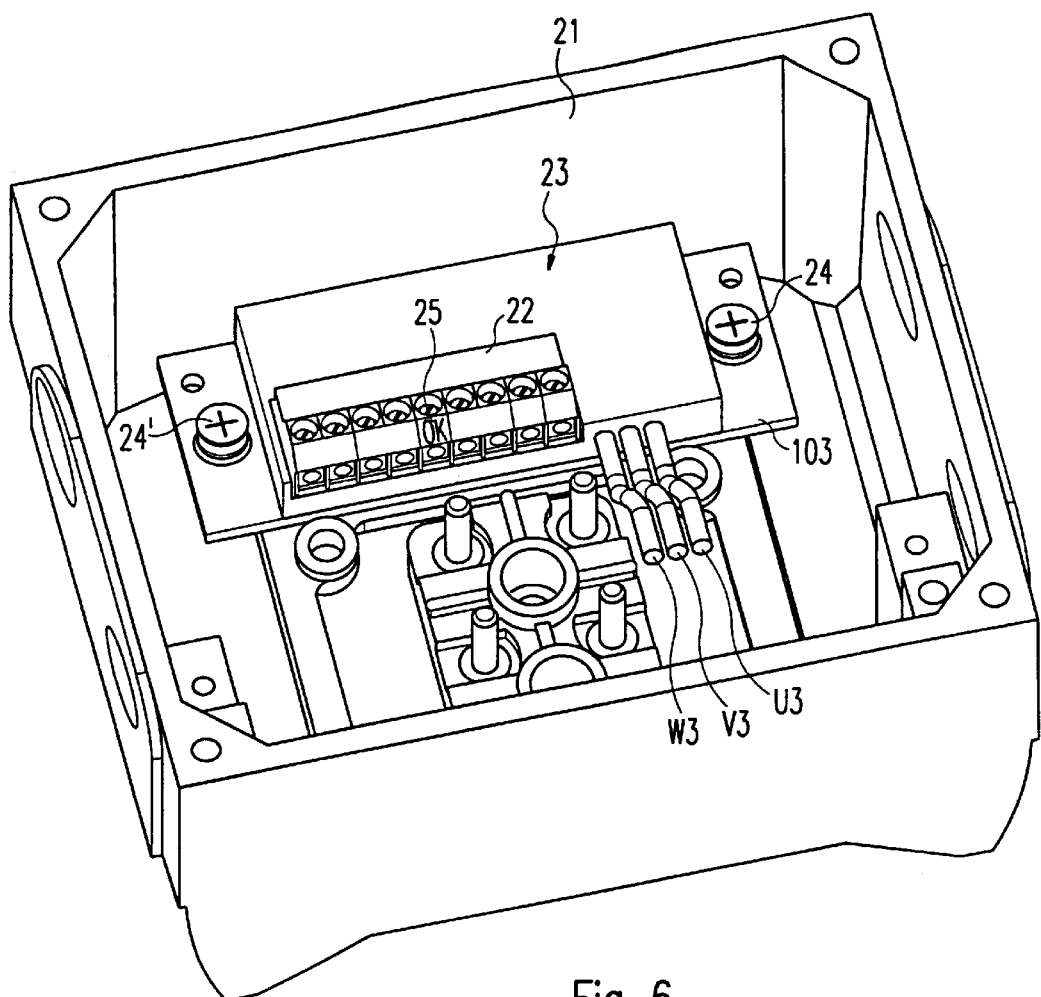
FIG. 6 is a perspective view of a terminal box with hybrid circuit mounted therein.

In FIG. 6 a terminal box 21 is shown, which can be mounted on the three-phase motor (not shown) by way of a gasket (not shown). The terminal box 21 is made of a material with high heat conductance. On its floor a hybrid circuit 23 is mounted, which contains the electronics necessary for control as described above. The box is assembled as follows: a hybrid board made of material with high heat conductance, preferably copper, which absorbs the heat from the semiconductor elements, in particular that from the electronic switch 4, is set flat onto the floor of the terminal box 21, so that the heatconduction resistance between the hybrid board 103 and the floor of-the terminal box 21 is very low. The heat produced by the electronic components is thus released to the surroundings both directly, from the board 103 and the mounting screws 24, 24', and indirectly by way of the terminal box 21. Furthermore, heat is also given off into the surroundings by way of connecting wires U3, V3 and W3, which pass out of the hybrid circuit 23 and are connected to the neutral ends of the windings as described above (not shown here).

To the hybrid circuit 23 is attached a connector strip 22, which in addition to connectors for the control inputs described above and those for the voltage supply comprises an "OK" output 25, a control output that sends out a binary signal indicating whether the system is ready to operate. Here "readiness to operate" means that all relevant parameters conform to the requirements for turning the three-phase motor on: in particular, temperatures in the correct ranges, but also functionality with respect to operating voltage and the like. This control output 25 can be connected to an alarm device or be used for remote monitoring.

Figure 7:
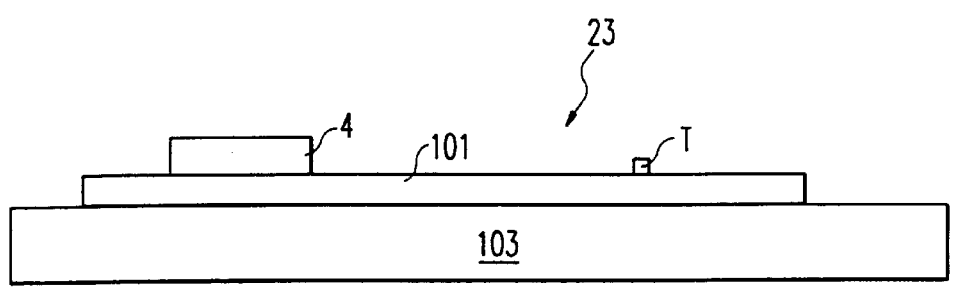
FIG. 7 is a schematic side view of the hybrid circuit to explain the principles of its construction.

The side view of the hybrid circuit 23 shown in FIG. 7 is intended to explain the principles of its construction. The reference numeral 101 indicates a ceramic mounting plate on which, in a manner known per se, the electronic switch 4 and the temperature sensor T are mounted. These two components are spaced apart by a distance such that the temperature sensor T measures the temperature of the copper circuit board 103 and does not directly measure that of the electronic switch 4. As a result, a correct temperature measurement of the entire component is made possible.

What is claimed is:

1. A three-phase motor for operation with a three-phase mains supply,
    with three single- or multiple-strand windings to form a star-connected set of windings, such that neutral-end terminals at neutral-ends of the windings are accessible outside the set of windings,
    an electronic switch so constructed and so connected by way of switch terminals to the neutral-end terminals that said neutral-end terminals can be electrically connected to one another during a process of turning the motor on and disconnected from one another during a process of turning off, and
    with a control circuit for controlling the electronic switch, so connected to the latter and so constructed that in response to an external signal the electronic switch can be turned on,
    wherein the electronic switch is mounted in a terminal box attached to the three-phase motor,
    with at least one temperature sensor constructed so as to monitor the temperature of the electronic switch and connected to the control circuit, the control circuit being so constructed that the electronic switch is turned on only if the temperature sensor signals a temperature that is not dangerous to the electronic switch, and
    wherein the control circuit is connected to a measurement device that is connected to the neutral-end terminals and monitors neutral-end voltages, the control circuit being so constructed that processes of turning the switch on and off are controlled in dependence on the neutral-end voltages.

2. The three-phase motor according to claim 1, wherein the control circuit is so constructed that in response to an external "on" signal the electronic switch is turned on if at the same time one of voltages of said neutral-end terminals exceeds a first threshold voltage, which is higher than a residual voltage that exists between the switch terminals when the switch is turned on, but is considerably lower than a voltage of the three-phase mains supply.

3. The three-phase motor according to claim 2, wherein the first threshold voltage amounts to 2% to 5%, preferably 3% of the voltage of the three-phase mains supply.

4. A three-phase motor for operation with a three-phase mains supply,
    with three single- or multiple-strand windings to form a star-connected set of windings, such that neutral-end terminals at neutral-ends of the windings are accessible outside the set of windings,
    an electronic switch so constructed and so connected by way of switch terminals to the neutral-end terminals that said neutral-end terminals can be electrically connected to one another during a process of turning the motor on and disconnected from one another during a process of turning off, and with a control circuit for controlling the electronic switch, so connected to the latter and so constructed that in response to an external signal the electronic switch can be turned on, wherein the electronic switch is mounted in a terminal box attached to the three-phase motor, with at least one temperature sensor constructed so as to monitor the temperature of the electronic switch and connected to the control circuit, the control circuit being so constructed that the electronic switch is turned on only if the temperature sensor signals a temperature that is not dangerous to the electronic switch, and wherein for protection against overvoltages the control circuit is so constructed that the switch is turned on or off when one of voltages at the neutral-end terminals exceeds or falls below, respectively, a second threshold voltage, which is higher than a voltage of the three-phase mains supply but lower than a damaging voltage, above which components of the switch or of the control circuit would be damaged or destroyed.

5. A three-phase motor for operation with a three-phase mains supply, with three single- or multiple-strand windings to form a star-connected set of windings, such that neutral-end terminals at neutral-ends of the windings are accessible outside the set of windings, an electronic switch so constructed and so connected by way of switch terminals to the neutral-end terminals that said neutral-end terminals can be electrically connected to one another during a process of turning the motor on and disconnected from one another during a process of turning off, and with a control circuit for controlling the electronic switch, so connected to the latter and so constructed that in response to an external signal the electronic switch can be turned on, wherein the electronic switch is mounted in a terminal box attached to the three-phase motor, with at least one temperature sensor constructed so as to monitor the temperature of the electronic switch and connected to the control circuit, the control circuit being so constructed that the electronic switch is turned on only if the temperature sensor signals a temperature that is not dangerous to the electronic switch, and wherein the electronic switch comprises an energy-supply device that supplies the electronic switch with switching or triggering energy and is so constructed and disposed, bridging the electronic switch, that a residual voltage present at the switch terminals when the electronic switch is in an "on" state can be used as a voltage supply for energy-supply device.

6. A three-phase motor for operation with a three-phase mains supply, with three single- or multiple-strand windings to form a star-connected set of windings, such that neutral-end terminals at neutral-ends of the windings are accessible outside the set of windings, an electronic switch so constructed and so connected by way of switch terminals to the neutral-end terminals that said neutral-end terminals can be electrically connected to one another during a process of turning the motor on and disconnected from one another during a process of turning off, and with a control circuit for controlling the electronic switch, so connected to the latter and so constructed that in response to an external signal the electronic switch can be turned on, wherein the electronic switch is mounted in a terminal box attached to the three-phase motor, with at least one temperature sensor constructed so as to monitor the temperature of the electronic switch and connected to the control circuit, the control circuit being so constructed that the electronic switch is turned on only if the temperature sensor signals a temperature that is not dangerous to the electronic switch, and wherein the three-phase motor is additionally equipped with an electromagnetically actuated mechanical brake that is released or raised when current flows through an excitation coil of the brake, wherein a supply voltage for excitation coil is obtained at the ends of the multiple strand windings.

7. A three-phase motor for operation with a three-phase mains supply, the motor comprising:

three single- or multiple-strand windings that are configured to form a star-connected set of windings, such that neutral-end terminals at neutral-ends of the windings are accessible outside the set of windings;

an electronic switch so constructed and so connected by way of switch terminals to the neutral-end terminals that said neutral-end terminals can be electrically connected to one another during a process of turning the motor on and disconnected from one another during a process of turning off, and a control circuit configured to control the electronic switch, the control circuit so connected to the electronic switch and so constructed that in response to an external signal the electronic switch can be turned on, wherein the electronic switch is mounted in a terminal box attached to the three-phase motor, and wherein the control circuit is connected to a measurement device that is connected to the neutral-end terminals and monitors neutral-end voltages, the control circuit being so constructed that processes of turning the switch on and off are controlled in dependence on the neutral-end voltages.

8. The three-phase motor according to claim 7, wherein the control circuit is so constructed that in response to an external "on" signal the electronic switch is turned on if at the same time one of voltages of said neutral-end terminals exceeds a first threshold voltage, which is higher than a residual voltage that exists between the switch terminals when the switch is turned on, but is considerably lower than a voltage of the three-phase mains supply.

9. The three-phase motor according to claim 8, wherein the first threshold voltage amounts to 2% to 5%, preferably 3% of the voltage of the three-phase mains supply.

10. A three-phase motor for operation with a three-phase mains supply, the motor comprising:

three single- or multiple-strand windings that are configured to form a star-connected set of windings, such that neutral-end terminals at neutral-ends of the windings are accessible outside the set of windings;

an electronic switch so constructed and so connected by way of switch terminals to the neutral-end terminals that said neutral-end terminals can be electrically connected to one another during a process of turning the motor on and disconnected from one another during a process of turning off; and a control circuit configured to control the electronic switch, the control circuit so connected to the electronic switch and so constructed that in response to an external signal the electronic switch can be turned on;

wherein the electronic switch is mounted in a terminal box attached to the three-phase motor, and wherein for protection against overvoltages the control circuit is so constructed that the electronic switch is turned on or off when one of voltages at the neutral-end terminals exceeds or falls below, respectively, a second threshold voltage, which is higher than a voltage of the three-phase mains supply but lower than a damaging voltage, above which components of the switch or of the control circuit would be damaged or destroyed.

11. A three-phase motor for operation with a three-phase mains supply, the motor comprising:

three single- or multiple-strand windings that form a star-connected set of windings, such that neutral-end terminals at neutral-ends of the windings are accessible outside the set of windings;

an electronic switch so constructed and so connected by way of switch terminals to the neutral-end terminals that said neutral-end terminals can be electrically connected to one another during a process of turning the motor on and disconnected from one another during a process of turning off; and a control circuit configured to control the electronic switch, the control circuit so connected to the latter and so constructed that in response to an external signal the electronic switch can be turned on;

wherein the electronic switch is mounted in a terminal box attached to the three-phase motor; and wherein the electronic switch comprises an energy-supply device that supplies the electronic switch with switching or triggering energy and is so constructed and disposed, bridging the electronic switch, that a residual voltage present at the switch terminals when the electronic switch is in an "on" state can be used as a voltage supply for energy-supply device.

12. A three-phase motor for operation with a three-phase mains supply, the motor comprising:

three single- or multiple-strand windings that form a star-connected set of windings, such that neutral-end terminals at neutral-ends of the windings are accessible outside the set of windings;

an electronic switch so constructed and so connected by way of switch terminals to the neutral-end terminals that said neutral-end terminals can be electrically connected to one another during a process of turning the motor on and disconnected from one another during a process of turning off; and a control circuit configured to control the electronic switch, the control circuit so connected to the latter and so constructed that in response to an external signal the electronic switch can be turned on;

wherein the electronic switch is mounted in a terminal box attached to the three-phase motor; and wherein the three-phase motor is additionally equipped with an electromagnetically actuated mechanical brake that is released or raised when current flows through an excitation coil of the brake, wherein a supply voltage for excitation coil is obtained at the ends of the multiple strand windings.

* * * * *